(12) United States Patent
Junk et al.

(10) Patent No.: US 11,608,441 B2
(45) Date of Patent: Mar. 21, 2023

(54) BIOCIDE- AND AMMONIA-FREE POLYMER DISPERSIONS

(71) Applicant: CELANESE INTERNATIONAL CORPORATION, Irving, TX (US)

(72) Inventors: Matthias Junk, Alsbach-Hähnlein (DE); Thomas Fichtner, Dalheim (DE)

(73) Assignee: CELANESE INTERNATIONAL CORPORATION, Irving, TX (US)

( * ) Notice: Subject to any disclaimer, the term of this patent is extended or adjusted under 35 U.S.C. 154(b) by 54 days.

(21) Appl. No.: 16/766,614

(22) PCT Filed: Nov. 29, 2017

(86) PCT No.: PCT/US2017/063687
§ 371 (c)(1),
(2) Date: May 22, 2020

(87) PCT Pub. No.: WO2019/108175
PCT Pub. Date: Jun. 6, 2019

(65) Prior Publication Data
US 2021/0002506 A1 Jan. 7, 2021

(51) Int. Cl.
| | | |
|---|---|---|
| *C09D 133/08* | (2006.01) | |
| *C08F 220/18* | (2006.01) | |
| *C08L 33/08* | (2006.01) | |
| *C09D 5/02* | (2006.01) | |

(52) U.S. Cl.
CPC ........ *C09D 5/027* (2013.01); *C08F 220/1804* (2020.02); *C08L 33/08* (2013.01); *C09D 133/08* (2013.01)

(58) Field of Classification Search
CPC .................. C09D 5/027; C09D 133/08; C08F 220/1804; C08F 220/18; C08L 33/08
USPC ......................................................... 524/442
See application file for complete search history.

(56) References Cited

U.S. PATENT DOCUMENTS

| | | |
|---|---|---|
| 2003/0078338 A1 | 4/2003 | Schlarb et al. |
| 2008/0269397 A1 | 10/2008 | Fichtner et al. |
| 2014/0323608 A1* | 10/2014 | Deller ............... C09D 5/14 523/122 |
| 2019/0071575 A1 | 3/2019 | Baum et al. |

FOREIGN PATENT DOCUMENTS

| | | |
|---|---|---|
| CN | 102702419 B | 10/2012 |
| DE | 10309404 A1 | 9/2004 |
| DE | 102014013455 A1 | 3/2016 |
| EP | 0617093 B1 | 12/1998 |
| EP | 1297079 B1 | 12/2005 |
| JP | 2013139506 A | 7/2013 |
| WO | 2017148572 A1 | 9/2017 |

OTHER PUBLICATIONS

International Search Report and Written Opinion issue in the corresponding Application No. PCT/US2017/063687 dated Jun. 22, 2018.

* cited by examiner

*Primary Examiner* — Kelechi C Egwim
(74) *Attorney, Agent, or Firm* — Peter W. Roberts; Calderon Safran & Cole P.C.

(57) ABSTRACT

A biocide- and ammonia-free aqueous polymer dispersion is obtained by radically initiated multi-stage emulsion polymerization and comprising particles comprising at least a first polymer phase formed from a monomer composition I and a second polymer phase from a different monomer composition II. The first polymer phase has a glass transition temperature below 20° C., and the second polymer phase has a glass transition temperature above 20° C., both as determined by differential scanning calorimetry according to ISO 16805. The polymer dispersion further comprises at least one water-soluble alkali metal silicate, at least one water-soluble alkali metal or alkaline earth metal alkyl siliconate, or a mixture thereof and has a pH of 10.0 or higher.

25 Claims, No Drawings

BIOCIDE- AND AMMONIA-FREE POLYMER DISPERSIONS

CROSS-REFERENCE TO RELATED APPLICATIONS

The present application is a U.S. National Phase of PCT/US2017/063687 filed on Nov. 29, 2017. The disclosure of the PCT Application is hereby incorporated by reference into the present Application.

FIELD

The present invention relates to biocide-free polymer dispersions, especially for use in gloss and semi-gloss coating compositions.

BACKGROUND

Due to environmental and health concerns, there has been a movement towards reducing the amount of volatile organic compounds (VOCs) in paints, stains, and other coating compositions, which evaporate into the environment upon paint film formation. Additives to paints that facilitate or impart desirable paint properties, such as better film coalescence, better resistance to blocking, better film durability, better physical and chemical scrub resistance, and tougher coatings, among others, also contain VOCs. The evaporation of VOCs often results in undesirable aromas, and exposure to such fumes, particularly in areas that are not well ventilated, remains a health concern. Thus, less volatile or non-volatile additives, as well as colorants, that impart comparable (or superior) properties to the paints have been used to replace higher VOC additives. The quest for low VOC paints or a better "green paint" is discussed in a New York Times newspaper article entitled "The Promise of Green Paint" (Kershaw, Sarah, The New York Times, May 15, 2008, p. F6).

The reduction of VOC in paints, stains and other coatings and in additives, however, has produced environmentally friendly paints that are more inviting to bacteria, algae, yeasts, fungi and other biological agents that thrive in an aqueous environment. These biological agents grow and die in paint cans and containers, and often impart an unpleasant odor and render paints unusable for its intended purpose, and can cause viscosity loss, discoloration, gassing, frothing, sedimentation and pH changes. Biological agents also present potential health issues. Certain biological agents, such as algae and molds, may grow on dried paint films covering walls or other substrates.

Biocides, particularly isothiazolinones, are therefore frequently added to aqueous paints and stains to control the growth of biological agents. Some of these biocides may remain on the dried paint film to control algae and molds. However, isothiazolinone-based biocides are known to cause allergic contact dermatitis and, in fact, among painters they are one of the most common causes of contact dermatitis. As a result, there is increasing publicity and regulation, especially in Europe, towards the reduction or elimination of biocides in paints and stains. This is turn has led to increasing interest in alternative methods of stabilizing paints against microbiological attack. One such method involves maintaining the paint at high pH values by the addition of inorganic alkaline buffers, such as water glass. The pH value must be high enough to inhibit microbial growth.

For example, EP1297079B1 discloses a preservative-free emulsion paint containing (a) 4-15 wt. % of polymer dispersion, calculated as the solids content, (b) 10-55 wt. % of pigment and/or filler and (c) a maximum of 2 wt. % of water-glass as an additive and contents of water to make up to 100 wt. %.

In addition, German patent application DE 10204013455 A1 discloses an emulsion paint containing (a) 2-30% of polymer dispersion, calculated as the solids content, (b) 10-60% of pigment and/or filler, (c) 0.5-5% of siliconate as an additive and contents of water to make up to 100 wt. %.

The polymer dispersions employed in such biocide-free paints can be either biocide-free or biocide-containing. However, biocide-free dispersions are prone to microbiological contamination and have a short shelf life. On the other hand, the biocides in biocide-containing dispersions need to be destroyed before or during the formulation of biocide-free paints. Biocide-containing dispersions are usually stabilized with a 3:1 mixture of chloromethylisothiazolinone (CMIT) and methylisothiazolinone (MIT) (CAS no. 55965-84-9). While CMIT is readily decomposed by treatment with, e.g., cysteine, MIT cannot be easily destroyed and is stable over a wide pH range. For binder-rich coatings, such as semi-gloss or gloss paints, the residual amount of MIT in the binder does not allow the paint to be labeled preservative-free.

To address this issue, International Patent Publication No. WO 2017/148572 A1 describes the use of purified CMIT with a content of 0-2 wt. % of MIT. However, this biocide is currently not listed as a Product-Type 6 (PT6) biocide (preservatives for products during storage) in the EU Biocidal Products Regulation (528/2012). Further, the subsequent chemical decomposition of a biocide is an additional process step associated with production time and additional costs.

There is therefore interest in providing a biocide-free polymer dispersion with an extended shelf life which is suitable as binder for biocide-free glossy coatings, which exhibit a low minimum film-forming temperature without the addition of organic solvents, plasticizers and coalescent agents, as well as good block resistance.

SUMMARY

In one aspect, the present invention resides in a biocide- and ammonia-free aqueous polymer dispersion obtained by radically initiated multi-stage emulsion polymerization and comprising particles comprising at least a first polymer phase formed from a monomer composition I and a second polymer phase from a different monomer composition II, wherein the first polymer phase has a glass transition temperature below 20° C., and wherein the second polymer phase has a glass transition temperature above 20° C., both as determined by differential scanning calorimetry according to ISO 16805, wherein the polymer dispersion further comprises at least one water-soluble alkali metal silicate, at least one water-soluble alkali metal or alkaline earth metal alkyl siliconate, or a mixture thereof, and wherein the pH of the polymer dispersion is 10.0 or higher.

In additional aspects, the invention resides in a process for producing the biocide- and ammonia-free aqueous polymer dispersion described and in coating compositions containing the same.

DETAILED DESCRIPTION

Described herein is a biocide- and ammonia-free aqueous polymer dispersion which is obtained by radically initiated multi-stage emulsion polymerization and which comprises particles comprising at least a first polymer phase formed from a monomer composition I and a second polymer phase from a different monomer composition II. The first polymer phase has a glass transition temperature below 20° C., such as in the range of from −30 to 10° C., preferably from −20 to 5° C., while the second polymer phase has a glass transition temperature above 20° C., such as above 30° C., preferably above 45° C., both as determined by differential scanning calorimetry according to ISO 16805. The polymer dispersion further comprises, as a buffer, at least one water-soluble alkali metal silicate, at least one water-soluble alkali metal or alkaline earth metal alkyl siliconate, or a mixture thereof, and has a pH of 10.0 or higher.

As used herein, the term "biocide-free" refers to a polymer dispersion which contains less than 10 ppm by weight, and preferably no detectable amount, of a compound listed as Product-Type 6 biocide in EU Biocidal Products Regulation (528/2012), particularly chloromethylisothiazolinone (CMIT) and methylisothiazolinone (MIT).

As used herein, the term "ammonia-free" refers to a polymer dispersion which contains less than 200 ppm by weight, and preferably no detectable amount, of ammonia, as present in ammonium hydroxide or other ammonium compounds.

Monomer Compositions I and II

Each of the monomer compositions I and II may comprise any desired ethylenically unsaturated monomer or mixture thereof capable of undergoing free radical polymerization to produce a polymer having the desired glass transition temperature.

Generally, the monomers used herein are selected from esters of ethylenically unsaturated carboxylic acids, vinylaromatic compounds, vinyl halogenides, olefins, dienes, and vinyl esters of alkanoic or aromatic acids, and mixtures thereof as main monomers. The use of monomer mixtures containing esters of ethylenically unsaturated carboxylic acids and/or vinylaromatic compounds as main monomers is particularly preferred. Main monomers are usually present in amounts of greater than 50% by weight, such as at least 80% by weight, based on the total amount of the monomers used in each of the monomer compositions I and II.

Suitable esters of ethylenically unsaturated carboxylic acids for use herein include $C_1$-$C_{18}$ alkyl esters of ethylenically unsaturated carboxylic acids, such as acrylic acid, methacrylic acid, maleic acid and fumaric acid. Examples include methyl acrylate, ethyl acrylate, n-propyl acrylate, isopropyl acrylate, isobornyl acrylate, n-butyl acrylate, t-butyl acrylate, 1-hexyl acrylate, 2-ethylhexyl acrylate, heptyl acrylate, octyl acrylate, 2-propylpentyl acrylate, 1-propylheptyl acrylate, lauryl acrylate, methyl methacrylate, methyl ethacrylate, n-propyl methacrylate, isopropyl methacrylate, n-butyl methacrylate, isobutyl methacrylate, tert-butyl methacrylate, isobornyl methacrylate, and cyclohexyl methacrylate.

Suitable vinyl aromatic compounds for use herein include vinyltoluene, alpha- and para-methylstyrene, alpha-butylstyrene, 4-n-butylstyrene, and most preferably styrene.

In some embodiments, at least one, and preferably both, of the monomer compositions I and II comprises monomers selected from the group consisting of esters of acrylic or methacrylic acid, styrene and mixtures thereof.

In some embodiments, each of the monomer compositions I and II comprises at least 50%, preferably at least 85% of monomers selected from the group consisting of esters of acrylic or methacrylic acid, styrene and mixtures thereof.

Some polymer dispersions may lack compatibility with the silicate and siliconate buffers employed herein. Lack of compatibility may lead to a coagulation of the polymer dispersion or to an excessive increase of viscosity. To provide for a silicate and siliconate stable polymer dispersion, at least one of monomer compositions I or II, and preferably at least monomer composition I, may comprise one or more monomers selected from the group consisting of ethylenically unsaturated sulfonic acids, ethylenically unsaturated phosphonic and phosphoric acids, ethylenically unsaturated carboxylic acids, ethylenically unsaturated carboxylic amides, ethylenically unsaturated carboxylic anhydrides and mixtures thereof. For example, monomer composition I may comprise from 1 to 10% by weight, preferably from 1.5 to 6% by weight, of one or more stabilizing monomers based on the total weight of monomers in monomer composition I. In addition, the monomer composition II may comprise from 0 to 5% by weight, preferably from 0.5 to 3% by weight, based on the total weight of monomers in monomer composition II of one or more stabilizing monomers.

For example, the stabilizing monomer may comprise an ethylenically unsaturated $C_3$-$C_8$ monocarboxylic acid and/or an ethylenically unsaturated $C_4$-$C_8$ dicarboxylic acid, together with the anhydrides or amides thereof. Examples of suitable ethylenically unsaturated $C_3$-$C_8$ monocarboxylic acids include acrylic acid, methacrylic acid and crotonic acid. Examples of suitable ethylenically unsaturated $C_4$-$C_8$ dicarboxylic acids include maleic acid, fumaric acid, itaconic acid and citraconic acid.

Examples of suitable ethylenically unsaturated sulfonic acids include those having 2-8 carbon atoms, such as vinylsulfonic acid, 2-acrylamido-2-methylpropanesulfonic acid, 2-acryloyloxyethanesulfonic acid and 2-methacryloyloxyethanesulfonic acid, 2-acryloyloxy- and 3-methacryloyloxypropanesulfonic acid. A preferred ethylenically unsaturated sulfonic acid is 2-acrylamido-2-methylpropanesulfonic acid. Examples of suitable ethylenically unsaturated phosphonic or phosphoric acids include vinylphosphonic acid, esters of phosphonic or phosphoric acid with hydroxyalkyl(meth)acrylates and ethylenically unsaturated polyethoxyalkyletherphosphates.

In addition to or instead of the above acids, it is also possible to use the salts thereof, preferably the alkali metal or ammonium salts thereof, particularly preferably the sodium salts thereof, such as, for example, the sodium salts of vinylsulfonic acid and of 2-acrylamidopropanesulfonic acid.

Preferred stabilizing monomers are ethylenically unsaturated sulfonic acids, ethylenically unsaturated carboxylic amides, and mixtures thereof. A particularly preferred stabilization systems comprises a mixture of at least one ethylenically unsaturated sulfonic acid and at least one ethylenically unsaturated carboxylic amide, preferably in combination with one or more ethylenically unsaturated $C_3$-$C_8$ monocarboxylic acids and/or ethylenically unsaturated $C_4$-$C_8$ dicarboxylic acids or their anhydrides.

In preferred embodiments, the polymer dispersion described herein is viscosity-stable upon storage. The term "viscosity-stable" refers to a polymer dispersion which is not prone to excessive thickening when stored for 28 days at 50° C., i.e., which possesses a Brookfield viscosity less than 50 Pas, preferably less than 10 Pas after storage (measurement conditions: 20° C., 20 rpm, spindle to be chosen according to the viscosity range of the dispersion).

Additionally or alternatively, one or both of the monomer compositions I and II may include up to 10% by weight, such as from 0.5 to 5% by weight, of one or more functional co-monomers adapted to promote better film or coating performance by the final coating composition. Such desirable film/coating properties can include, for example, enhanced adhesion to surfaces or substrates, improved wet adhesion, better resistance to removal by scrubbing or other types of weathering or abrasion, and improved resistance to film or coating cracking. The optional co-monomers useful for incorporation into the emulsion copolymers of the compositions herein are those which contain one polymerizable double bond along with one or more additional functional moieties. Such optional or auxiliary co-monomers can include unsaturated silane co-monomers, glycidyl co-monomers, ureido co-monomers, carbonyl-functional monomers and combinations of these auxiliary optional co-monomers.

Unsaturated silanes useful as optional co-monomers can generally correspond to a substituted silane of the structural Formula I:

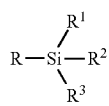

Formula I in which R denotes an organic radical olefinically unsaturated in the ω-position and $R^1$ $R^2$ and $R^3$ which may be identical or different, denote the group —OZ, Z denoting hydrogen or primary or secondary alkyl or acyl radicals optionally substituted by alkoxy groups. Suitable unsaturated silane compounds of Formula I are preferably those in which the radical R in the formula represents an ω-unsaturated alkenyl of 2 to 10 carbon atoms, particularly of 2 to 4 carbon atoms, or an ω-unsaturated carboxylic acid ester formed from unsaturated carboxylic acids of up to 4 carbon atoms and alcohols of up to 6 carbon atoms carrying the Si group. Suitable radicals $R^1$, $R^2$, $R^3$ are preferably the group —OZ, Z representing primary and/or secondary alkyl radicals of up to 10 carbon atoms, preferably up to 4 carbon atoms, or alkyl radicals substituted by alkoxy groups, preferably of up to 3 carbon atoms, or acyl radicals of up to 6 carbon atoms, preferably of up to 3 carbon atoms, or hydrogen. Most preferred unsaturated silane co-monomers are vinyl trialkoxy silanes.

Examples of preferred silane compounds of the Formula I include γ-methacryloxypropyltris(2-methoxyethoxy)silane, vinylmethoxysilane, vinyltriethoxysilane, vinyldiethoxysilanol, vinylethoxysilanediol, allyltriethoxysilane, vinyltripropoxysilane, vinyltriisopropoxysilane, vinyltributoxysilane, vinyltriacetoxysilane, trimethylglycolvinylsilane, γ-methacryloxypropyltrimethylglycolsilane, γ-acryloxypropyltriethoxysilane and γ-methacryloxypropyltrimethoxysilane.

Glycidyl compounds can also be used as optional functional co-monomers to impart epoxy-functionality to the emulsion copolymer. Examples of suitable glycidyl optional co-monomers include glycidyl acrylate, glycidyl methacrylate, allyl glycidyl ether, and vinyl glycidyl ether.

Another type of functional co-monomer comprises cyclic ureido co-monomers. Cyclic ureido co-monomers are known to impart improved wet adhesion properties to films and coatings formed from copolymers containing these co-monomers. Cyclic ureido compounds and their use as wet adhesion promoting co-monomers are disclosed in U.S. Pat. Nos. 4,104,220; 4,111,877; 4,219,454; 4,319,032; 4,599,417 and 5,208,285. The disclosures of all of these U.S. patents are incorporated herein by reference in their entirety.

Other suitable functional co-monomers include unsaturated compounds that contain one or more carbonyl moieties. Examples of such suitable co-monomers include diacetone acrylamide (DAAM), polymerizable 1,3-dicarbonyl compounds and polymerizable 1,3-diketoamides. Suitable polymerizable 1,3-dicarbonyl compounds include acetoacetoxyethyl acrylate, acetoacetoxyethyl methacrylate (AAEM), acetoacetoxypropyl methacrylate, acetoacetoxybutyl methacrylate, 2,3-di(acetoacetoxy)propyl methacrylate and allyl acetoacetate. Such monomers are known to impart improved wet adhesion properties to coating compositions, especially on alkyd substrates (See DE 2535372 A1). Suitable polymerizable 1,3-diketoamides include those compounds described in U.S. Pat. No. 5,889,098, which patent is incorporated herein by reference. Examples of compounds of this type include amido acetoacetonates such as 3-isopropenyl-α,α-dimethylbenzyl amidoacetoacetate, 4-isopropenyl-α,α-dimethylbenzyl amidoacetoacetate, 4-ethylenyl-phenyl amidoacetoacetate and the like.

Optionally, the monomer compositions used in the present process may also contain up to 3% by weight, such as from 0.1 to 2% by weight, of monomers (d) with at least two non-conjugated ethylenically unsaturated groups. Such cross-linking co-monomers include triallyl cyanurate, triallyl isocyanurate, diallyl maleate, diallyl fumarate, divinyl benzene, diallyl phthalate, hexanediol diacrylate, ethyleneglycol dimethacrylate, and polyethylene glycol diacrylate.

The weight ratio of monomer composition I to monomer composition II used to produce the polymer dispersion described herein ranges from 40:60 to 80:20, preferably from 50:50 to 65:35.

Dispersion Stabilization System

Both during and after polymerization, the multi-stage polymer described herein is stabilized in the form of an aqueous copolymer dispersion or latex. The copolymer dispersion is therefore prepared in the presence of and subsequently contains a stabilization system which generally comprises emulsifiers, in particular nonionic emulsifiers and/or anionic emulsifiers and/or protective colloids. Mixtures of the different stabilizers can also be employed.

The amount of emulsifier employed will generally be at least 0.5 wt. %, based on the total quantity of monomers in the copolymer dispersion. Generally, emulsifiers can be used in amounts up to about 8 wt. %, based on the total quantity of monomers in the copolymer dispersion. Emulsifiers employed with preference herein are nonionic emulsifiers having alkylene oxide groups and/or anionic emulsifiers having sulfate, sulfonate, phosphate and/or phosphonate groups. Such emulsifiers, if desired, can be used together with molecularly or dispersely water-soluble polymers. Preferably also the emulsifiers used contain no alkylphenolethoxylate (APEO) structural units.

Examples of suitable nonionic emulsifiers include acyl, alkyl, oleyl, and alkylaryl ethoxylates. These products are commercially available, for example, under the name Genapol®, Lutensol® or Emulan®. They include, for example, ethoxylated mono-, di-, and tri-alkylphenols (EO degree: 3 to 50, alkyl substituent radical: $C_4$ to $C_{12}$) and also ethoxylated fatty alcohols (EO degree: 3 to 80; alkyl radical: $C_8$ to $C_{36}$), especially $C_{10}$-$C_{14}$ fatty alcohol (3-40) ethoxylates, $C_{11}$-$C_{15}$ oxo-process alcohol (3-40) ethoxylates, $C_{16}$-$C_{18}$ fatty alcohol (11-80) ethoxylates, $C_{11}$ oxo-process alcohol (3-40) ethoxylates, $C_{13}$ oxo-process alcohol (3-40) ethoxylates, polyoxyethylenesorbitan monooleate with 20 ethylene oxide groups, copolymers of ethylene oxide and propylene oxide having a minimum ethylene oxide content of 10% by weight, the polyethylene oxide (4-40) ethers of oleyl alcohol, and the polyethene oxide (4-40) ethers of nonylphenol. Particularly suitable are the polyethylene oxide (4-40) ethers of fatty alcohols, more particularly of oleyl alcohol, stearyl alcohol or $C_{11}$ alkyl alcohols.

The amount of nonionic emulsifiers used in preparing the copolymer dispersions herein is typically up to about 8% by weight, preferably up to about 5% by weight, more preferably up to about 3% by weight, based on the total monomer quantity. Mixtures of nonionic emulsifiers can also be employed.

Examples of suitable anionic emulsifiers include sodium, potassium, and ammonium salts of linear aliphatic carboxylic acids of chain length $C_{12}$-$C_{20}$, sodium hydroxyoctadecanesulfonate, sodium, potassium, and ammonium salts of hydroxy fatty acids of chain length $C_{12}$-$C_{20}$ and their sulfonation and/or sulfation and/or acetylation products, alkyl sulfates, including those in the form of triethanolamine salts, alkyl($C_{10}$-$C_{20}$) sulfonates, alkyl($C_{10}$-$C_{20}$) arylsulfonates, and their sulfonation products, lignosulfonic acid and its calcium, magnesium, sodium, and ammonium salts, resin acids, hydrogenated and dehydrogenated resin acids, and their alkali metal salts, dodecylated sodium diphenyl ether disulfonate, sodium alkyl sulfate, sulfated alkyl or aryl ethoxylate with EO degree between 1 and 30, for example ethoxylated sodium lauryl ether sulfate or a salt of a bisester, preferably of a bis-$C_4$-$C_{18}$ alkyl ester, of a sulfonated dicarboxylic acid having 4 to 8 carbon atoms, or a mixture of these salts, preferably sulfonated salts of esters of succinic acid, more preferably salts, such as alkali metal salts, of bis-$C_4$-$C_{18}$ alkyl esters of sulfonated succinic acid, or phosphates of polyethoxylated alkanols. Particularly suitable are sodium or potassium alkyl sulfates such as sodium lauryl sulfate, and sodium, potassium or ammonium salts of sulfated $C_{10}$-$C_{16}$ alkyl ethoxylates with an EO degree between 1 and 30.

The amount of anionic emulsifiers used can typically range from about 0.1% to about 3.0% by weight, preferably from about 0.1% to about 2.0% by weight, more preferably from about 0.5% to about 1.5% by weight, based on the total monomer quantity. Mixtures of anionic emulsifiers can also be employed.

Also suitable as stabilizers for the present dispersions are copolymerizable nonionic and anionic surfactants such as those disclosed in US 2014/0243552. Other suitable copolymerizable surfactants are sold under the trade names Hitenol® BC, Hitenol® KH, Hitenol® AR, Adeka Reasoap SR, and Adeka Reasoap ER.

Along with emulsifiers, the aqueous copolymer dispersions employed in accordance with the present development may also comprise as part of the stabilizer system a selected type of protective colloid based on cellulose ethers, poly vinyl alcohol, poly vinyl pyrrolidone, polyacrylic acid, maleic acid styrene copolymers or other water-soluble polymers. Suitable protective colloids used in the copolymer dispersions herein include water-soluble or water-dispersible polymeric modified natural substances based on cellulose ethers. Such cellulose ethers have a viscosity, when tested as a 1 wt. % aqueous in water at 25° C., of 5 to 5,000 mPas, preferably of 10 to about 1,500 mPas, more preferably 10 to 500 mPas. Mixtures of celluloses ethers may be used to achieve these viscosity values. Examples of suitable cellulose ether materials include methyl cellulose, hydroxyethyl cellulose, hydroxypropyl cellulose, hydroxypropyl methyl cellulose, ethyl hydroxyethyl cellulose, methyl hydroxyethyl cellulose and combinations of these cellulose ethers. Carboxymethyl cellulose (CMC) is most preferred, as described in U.S. Pat. No. 4,492,780.

Hydrophobically modified cellulose ethers may also be employed as the protective colloid in the copolymer dispersions herein. Such materials comprise cellulose ethers which have been hydrophobically modified with long chain hydrocarbon groups to reduce their water solubility. Hydrophobically modified cellulose ethers of this type are those described, for example, in U.S. Pat. Nos. 4,228,277; 4,352,916 and 4,684,704; all of which patents are incorporated herein by reference.

The protective colloids can be used individually or in combination. In the case of combinations, the two or more colloids can each differ in their molecular weights or they can differ in their molecular weights and in their chemical composition, such as the degree of hydrolysis, for example.

When protective colloids are used, the amount thereof, based on the total amount of monomers used, is typically from 0.1 to 5 parts by weight, preferably from 0.3 to 5 parts by weight.

In a preferred variant, the present dispersions contain no protective colloid at all, or the amount of protective colloid, based on the total amount of monomers used, is less than 1% by weight, more preferably less than 0.5% by weight.

In a particularly preferred variant, the present dispersions neither contain protective colloids nor nonionic emulsifiers.

In addition to the emulsifiers and protective colloids that are used during the emulsion polymerization of the copolymers herein, it is also possible to add further emulsifiers, protective colloids and/or other stabilizers after the polymerization.

Preparation of the Polymer Dispersion

The desired copolymer dispersion is produced by multi-stage emulsion polymerization of the monomers and stabilizing system described above in an aqueous medium and in the presence of one or more free radical initiators. Suitable free radical initiators include hydrogen peroxide, benzoyl peroxide, cyclohexanone peroxide, isopropyl cumyl hydroperoxide, persulfates of potassium, of sodium and of ammonium, peroxides of saturated monobasic aliphatic carboxylic acids having an even number of carbon atoms and a $C_8$-$C_{12}$ chain length, tert-butyl hydroperoxide, di-tert-butyl peroxide, diisopropyl percarbonate, azoisobutyronitrile, acetylcyclohexanesulfonyl peroxide, tert-butyl perbenzoate, tert-butyl peroctanoate, bis(3,5,5-trimethyl)hexanoyl peroxide, tert-butyl perpivalate, hydroperoxypinane, p-methane hydroperoxide. The abovementioned compounds can also be used within redox systems, using transition metal salts, such as iron(II) salts, or other reducing agents. Alkali metal salts of oxymethanesulfinic acid, hydroxylamine salts, sodium dialkyldithiocarbamate, sodium bisulfite, ammonium bisulfite, sodium dithionite, diisopropyl xanthogen disulfide, ascorbic acid, tartaric acid, and isoascorbic acid can also be used as reducing agents.

The multi-stage emulsion polymerization may be carried out in accordance with the customary techniques of emulsion polymerization. Monomer composition I may be polymerized before or after monomer composition II, i.e., the first polymer phase does not necessarily need to be obtained before the second polymer phase. Preferably, the process is carried out by first emulsifying and then polymerizing in a first stage the monomer composition I in an aqueous phase in the presence of emulsifiers, initiators and, if desired, protective colloids, at suitable temperatures of, for example from 50 to 95° C., preferably 65 to 90° C., to produce a first polymer phase. Subsequently, the monomer composition II is polymerized in a second stage in the aqueous phase in the presence of the polymerized composition I as well as emulsifiers, initiators and, if desired, protective colloids, at suitable temperatures of, for example, from 50 to 95° C., preferably 65 to 90° C., to produce the second polymer phase and thereby to obtain polymer particles comprising the first and second polymer phase. A variety of particle morphologies may be obtained, ranging from core-shell to Janus and raspberry structures. In case of a core-shell morphology, the first polymer phase does not necessarily correspond to the core phase of the polymer particle.

In some embodiments, it may be desirable to pre-polymerize a small amount (less than 10 weight %) of the monomer composition I or II to produce an in-situ seed before the remaining amounts of the monomer composition I and the monomer composition II are sequentially metered into the reactor to form the final polymer dispersion.

The molecular weight of the various copolymers in the copolymer dispersions herein can be adjusted by adding small amounts of one or more molecular weight regulator substances, also known as chain transfer agents (CTA). These CTAs are generally used in an amount of up to 2% by weight, based on the total weight of the monomers in monomer mixtures I and II. It is possible to use all of the CTAs known to the skilled artisan. Preference is given to organic thio compounds such as methylthiol, ethylthiol, n-propylthiol, n-butylthiol, n-hexylthiol, n-octylthiol, n-decylthiol, n-dodecylthiol, n-tetradecylthiol, n-hexadecylthiol, n-octadecylthiol, cyclohexylthiol, isopropylthiol, tert-butylthiol, tert-nonylthiol, tert-dodecylthiol, 4-methylbenzene thiol, 2-mercaptopropionic acid, isooctyl 3-mercaptopropionate, 4,4'-thiobisbenzenethiol, pentaerythritol tetrakis(2-mercaptoacetate) and pentaerythritol tetrakis (3-mercaptopropionate). Preferably, the polymerization is conducted in the presence of less than 0.05% by weight, based on the total weight of the monomers in monomer mixtures I and II, of a CTA, more preferably in the absence of chain transfer agents to obtain polymers with a high weight average molecular weight >20,000 g/mol, preferably >50,000 g/mol, most preferably >100,000 g/mol, as measured by gel permeation chromatography. The high molecular weight of the polymer further enhances the block resistance of coatings using the present polymer dispersion.

On completion of the polymerization, a further, preferably chemical after-treatment, especially with redox catalysts, for example combinations of the above-mentioned oxidizing agents and reducing agents, may follow to reduce the level of residual unreacted monomer on the product. In addition, residual monomer can be removed in known manner, for example by physical demonomerization, i.e. distillative removal, especially by means of steam distillation, or by stripping with an inert gas. A particularly efficient combination is one of physical and chemical methods, which permits lowering of the residual monomers to very low contents (<1000 ppm, preferably <100 ppm).

The polymerized particles produced by the present process typically have a weight-averaged diameter of less than 150 nm, preferably less than 120 nm, more preferably equal or less than 100 nm, as measured by a combination of laser diffraction and polarization intensity differential scattering (PIDS) using a Beckman Coulter LS 13320 Particle Size Analyzer.

In addition to monomers described herein, the final polymers may also contain a water-soluble cross-linking agent. Such a cross-linking agent will react with specific polymer functionalities such as carbonyl or 1,3-dicarbonyl groups as water is removed from the coating compositions herein and as a film or coating is formed from the polymerized components.

A type of water-soluble cross-linking agent that can be used in the compositions herein comprises a compound which contains at least two hydrazine and/or hydrazide moieties. Particularly suitable are dihydrazine compounds of aliphatic dicarboxylic acids of 2 to 10, in particular 4 to 6, carbon atoms, e.g., oxalic acid dihydrazide, malonic acid dihydrazide, succinic acid dihydrazide, glutaric acid dihydrazide, adipic acid dihydrazide, sebacic acid dihydrazide, maleic acid dihydrazide, fumaric acid dihydrazide and/or itaconic acid dihydrazide. Water-soluble aliphatic dihydrazines of 2 to 4 carbon atoms, e.g., ethylene-1,2-dihydrazine, propylene-1,3-dihydrazine or butylene-1,4-dihydrazine, are also suitable. Adipic acid dihydrazide (ADH) is a preferred water-soluble cross-linking agent for use in the compositions herein, especially those produced from monomer compositions containing diacetone acrylamide (DAAM).

Other suitable water-soluble cross-linking agents are compounds which contain at least two amine functional moieties such as ethylene diamine and hexamethylene diamine Such cross-linking agents are preferred in combination with polymers comprising 1,3-dicarbonyl groups, such as acetoacetoxyethyl methacrylate (AAEM).

Generally, such water-soluble cross-linking agents are post added to the dispersion such that the molar ratio of cross-linking agent functional groups to polymer functional groups is between about 0.1 and about 2.0. More preferably the molar ratio of cross-linking agent functional groups to copolymer functional groups in the blend will be between about 0.5 and 2.0.

The aqueous polymer dispersions produced by the process of the invention generally have a solids content of from 30 to 70% by weight, preferably from 40 to 55% by weight.

The aqueous polymer dispersions described herein are free of ammonia and biocides, as described above. Additionally, in some embodiments, the present aqueous polymer dispersions have a Total Volatile Organic Compound (TVOC) content less than 2000 ppm, preferably less than 1000 ppm, as determined by gas chromatography according to ISO 11890-2. A volatile organic compound is defined herein as a carbon containing compound that has a boiling point below 250° C. at atmospheric pressure (as defined in the Commission Decision 2014/312/EU). The TVOC content may be determined by gas chromatography according to ISO 11890-2, or alternatively for products with a VOC content of less than 1.0 g/L according to ISO 17895.

After polymerization the dispersion is typically neutralized to a pH value of at least 10. This can be accomplished by, for example, the addition of an organic or inorganic base, such as an amine or an alkali metal hydroxide, such as sodium or potassium hydroxide. In some embodiments, it is preferred to effect neutralization with a nitrogen-free base.

Buffer

The polymer dispersion described herein further comprises a buffer system to stabilize the pH of the neutralized polymer dispersion above a value of 10.0, preferably in the range of 10.0 to 12.0, more preferably in the range of 10.5 to 11.5.

Suitable buffer systems for this pH range are water-soluble alkali metal silicates, water-soluble alkali metal or alkaline earth metal alkyl siliconates, or a mixture thereof.

Water-soluble alkali metal silicates, also known as water glass or liquid glass, are described by the chemical formula $M_2O \times n\ SiO_2$, where M can be lithium, sodium or potassium, and where n can range between 1-4. Preferably, alkali metal silicates with n>3.2 are used. A preferred alkali metal silicate is potassium silicate.

Due to the ease of handling and mixing, aqueous solutions of alkali metal silicates are preferably used, particularly those with a solid content not exceeding 40 wt. %.

In addition to or instead of water-soluble alkali metal silicates, water-soluble alkali metal or alkaline earth metal alkyl siliconates, such as sodium, potassium or calcium methyl siliconate, can be used. A preferred siliconate is potassium methyl siliconate. Due to the ease of handling and mixing, aqueous solutions of siliconates are preferably used.

Also, preparations comprising alkali metal silicates and/or alkali metal or alkaline earth metal alkyl siliconates, such as Lopon® PHB, marketed by ICL, can be used.

Particularly preferred is the use of potassium silicate as buffer component.

Preferably, the polymer dispersion comprises, based on the total weight of the polymer dispersion, 0.1 to 4 wt. %, preferably 0.2 to 3 wt. %, more preferably 0.3 to 2 wt. %, most preferably 0.4 to 1.5 wt. % of at least one water-soluble alkali metal silicate, at least one water-soluble alkali metal or alkaline earth metal alkyl siliconate, or a mixture thereof.

The at least one water-soluble alkali metal silicate, at least one water-soluble alkali metal or alkaline earth metal alkyl siliconate, or a mixture thereof can be added to the polymer dispersion before, during, or after polymerization. Preferably, the buffer component is post-added to the dispersion after completion of the polymerization. More preferably, it is post-added below 50° C.

In preferred embodiments, the buffer system renders the polymer dispersion pH-stable upon storage. The term "pH-stable" refers to a polymer dispersion with a pH drop less than 1.0, preferably less than 0.5, when stored for 28 days at 50° C.

Coating/Paint Composition Formulation and Preparation

The aqueous polymer dispersions described herein are stable fluid systems which can be used to produce glossy coating compositions suitable such as trim paints, semi-gloss or satin interior paints, lacquers, varnishes and wood stains. When used in paint applications, the aqueous polymer dispersions are typically combined with one or more conventional fillers and/or pigments. In this context, pigments are understood as solids which have a refractive index greater than or equal to 1.75, whereas fillers are understood as meaning solids which have a refractive index of less than 1.75.

Preferred fillers useful in the paint compositions herein can be, for example, calcium carbonate, magnesite, dolomite, kaolin, mica, talc, silica, calcium sulfate, feldspar, barium sulfate and opaque polymers. Examples of white pigments useful in the paint compositions herein can be zinc oxide, zinc sulfide, basic lead carbonate, antimony trioxide, lithopone (zinc sulfide+barium sulfate) and, preferably, titanium dioxide. Examples of inorganic colored pigments which may preferably be used in the paint compositions herein include iron oxides, carbon black, graphite, luminescent pigments, zinc yellow, zinc green, Paris blue, ultramarine, manganese black, antimony black, manganese violet, bismuth vanadate or Schweinfurt green. Suitable organic colored pigments preferably are, for example, sepia, gamboge, Cassel brown, toluidine red, para red, Hansa yellow, indigo, azo dyes, anthraquinone and indigo dyes as well as dioxazine, quinacridone, phthalocyanin, isoindolinone and metal complex pigments of the azomethine series.

The fillers may be used as individual components. Mixtures of fillers such as, for example, calcium carbonate/ kaolin and calcium carbonate/kaolin/talc have also been found to be particularly useful in practice. To increase the hiding power of the coating and to save on titanium dioxide, finely divided fillers such as, for example, finely divided calcium carbonate and mixtures of various calcium carbonates with different particle size distribution are frequently used. To adjust the hiding power, the shade and the depth of color of the coatings formed, the fillers are mixed with appropriate amounts of white pigment and inorganic and/or organic colored pigments. To disperse the fillers and pigments in water, auxiliaries based on anionic or non-ionic wetting agents, such as preferably, for example, sodium pyrophosphate, sodium polyphosphate, naphthalenesulfonate, sodium polyacrylate, sodium polymaleinates and polyphosphonates such as sodium 1-hydroxyethane-1,1-diphosphonate and sodium nitrilotris(methylenephosphonate), may be added.

Thickeners may also be added to the paint formulations herein. Thickeners which may be used include, inter alia, sodium polyacrylate and water-soluble copolymers based on acrylic and methacrylic acid, such as acrylic acid/acrylamide and methacrylic acid/acrylic ester copolymers. Hydrophobically-modified alkali soluble (acrylic) emulsions (HASE), hydrophobically-modified ethoxylate (poly)urethanes (HEUR), hydrophobically-modified ethoxylate (poly)urethane alkali-swellable/soluble emulsions (HEURASE), polyether polyols (PEPO), polyuria, and cellulose ether based thickeners are also available. Inorganic thickeners, such as, for example, bentonites or hectorite, may also be used.

For various applications, it is sometimes also desirable to include small amounts of other additives, such as pH modifiers, and antifoamers, incorporated in the latex paint compositions herein. This may be done in a conventional manner and at any convenient point in the preparation of the latexes. Coating compositions produced herein are generally free of any organic solvent, plasticizer or coalescent agent.

Preferably, the polymer dispersion described herein is used to produce biocide-free coating compositions. Analogously to the inventive polymer dispersions, the pH of these biocide-free coating compositions is adjusted with an ammonia-free base above a value of 10.0, preferably in the range of 10.0 to 12.0, more preferably in the range of 10.5 to 11.5, to inhibit microbial growth. In addition to the silicate and/or siliconate buffer system of the polymer dispersion, the biocide-free coating compositions may comprise at least one water-soluble alkali metal silicate, at least one water-soluble alkali metal or alkaline earth metal alkyl siliconate, or a mixture thereof. The buffer system of the coating composition may be the same as or different than the buffer system of the polymer dispersion. A preferred buffer is potassium silicate. Preferably, the coating composition comprises, based on the total weight of the coating composition, 0.1 to 4 wt. %, preferably 0.2 to 3 wt. %, more preferably 0.3 to 2 wt. %, most preferably 0.4 to 1.5 wt. % of at least one water-soluble alkali metal silicate, at least one water-soluble alkali metal or alkaline earth metal alkyl siliconate, or a mixture thereof.

The biocide-free coating compositions may further comprise stabilizers, that prevent premature silicification of the silicate of siliconate buffers. Suitable stabilizers are organic compounds comprising the functionalities of primary, secondary, or tertiary amines or quarternary ammonium salts.

Preferred pigment volume concentrations (PVC) of the glossy coating compositions according to the invention are below the critical PVC, at least less than 55%, and more preferably in the range between 20 and 45%. The pigment volume concentration is defined as the ratio of the volumes of pigments and fillers to the total volume of pigment, fillers and (dry) binders. Herein, the silicate and siliconate buffers are counted as binders.

The aqueous copolymer dispersion described herein is particularly useful as binder for waterborne high-gloss coating compositions with low emission regarding Total Volatile Organic Compound (TVOC) and Total Semi Volatile Organic Compound (TsVOC) contents. sVOC compounds have a boiling point above 250° C. (as defined in detail in the Commission Decision 2014/312/EU) and may be determined by gas chromatography according to ISO 11890-2.

In some embodiments, coating compositions produced from the aqueous copolymer dispersions described herein have a TVOC content less than 1000 ppm, more preferably less than 500 ppm, as determined by gas chromatography according to ISO 11890-2.

Coating/Paint Composition Performance

When used in a gloss or semi-gloss coating composition, the polymer dispersion described herein forms a film or coating which, upon curing, will adhere to a substrate onto which the film has been applied. The coating composition seals and protects the substrate.

The minimum temperature required for the polymer dispersion or coating composition to form a film is referred to as the minimum film forming temperature or MFFT (DIN ISO 2115). The polymer dispersion herein may have a MFFT of less than 6° C., preferably less than 4° C., more preferably less than 1° C.

As noted above, another important performance property of the coating compositions described herein is the ability to produce a high gloss film. In particular, a coating composition produced from the present polymer dispersion may produce a film having more than 20 gloss units, when measured with a glossmeter at an angle of 85° according to ASTM D523.

Additionally or alternatively, a coating composition produced from the present polymer dispersion may produce a film having at least a wet scrub class II according to EN 13300.

Additionally or alternatively, a coating composition produced from the present polymer dispersion may produce a block-resistant film. When subjecting two coated specimens with a force of 2 kg for 1 hour at 40° C. when placed on top of each other at a 90° angle with their coated sides facing each other, the force required to separate the specimen is preferably below 500 g/6.25 cm$^2$.

The invention will now be more particularly described with reference to the following non-limiting Examples.

EXAMPLE 1

A 3 liter reactor equipped with a reflux condenser and an anchor stirrer was filled with 600 g of deionized (DI) water and 17 g of a 27% active aqueous solution of a sodium lauryl ether sulfate with approx. 2 ethylene oxide units. The reactor content was heated to 80° C. and 6% of monomer feed 1 was added (initial charge). Monomer feeds 1 and 2 were obtained by mixing the ingredients in Table 1 under stirring. A solution of 0.6 g sodium persulfate in 12 g of water was added and the reactor contents were held at 80° C. for 15 min (seed polymerization). Subsequently, the remaining amount of monomer feed 1 was added to the reactor with a constant dosage rate over 120 min. After completion of the addition of monomer feed 1, monomer feed 2 was added to the reactor with a constant dosage rate over 90 min. The reactor temperature was maintained at 80° C. during the feed additions. After completion of the feed additions, a solution of 0.6 g sodium persulfate in 6 g water was added to the reactor. Subsequently, 0.6 g of sodium metabisulfite in 6 g water were added within 30 min. The reactor content was held at 80° C. for another 45 minutes and then cooled to 50° C. At 50° C., 0.9 g of tert-butylhydroperoxide (TBHP, 70%) in 12 g water were added to the reactor. Subsequently, 0.6 g of sodium metabisulfite in 12 g water were added within 30 min. The reactor content was cooled to room temperature and the pH of the resulting dispersion was adjusted to approx. 8.5 with 5% caustic soda.

250 mL of DI water were added to the dispersion, which was then subjected to distillation under reduced pressure using a rotary evaporator to reduce the level of volatile organic compounds (VOC). The distillation was conducted at approx. 70° C. and at approx. 200 mbar and was stopped after 250 mL liquid had been distilled off. This process of water addition and distillation was repeated twice.

EXAMPLE 1 A (INVENTIVE)

12.5 g of Betolin® K 28, a 28% active aqueous solution of potassium silicate from Wöllner, were slowly added to 500 g of the dispersion according to Example 1. Subsequently, the pH of the dispersion was adjusted to approx. 11.2 with 10% caustic soda.

The properties of the resulting polymer dispersion are summarized in Table 2.

EXAMPLE 1 B (INVENTIVE)

25 g of Betolin® K 28 were slowly added to 500 g of the dispersion according to Example 1. Subsequently, the pH of the dispersion was adjusted to approx. 11.2 with 10% caustic soda. The properties of the resulting polymer dispersion are summarized in Table 2.

EXAMPLE 1 C (COMPARATIVE)

The pH of the dispersion according to Example 1 was adjusted to approx. 11.2 with 10% caustic soda. No Betolin® K 28 was added.

The properties of the resulting polymer dispersion are summarized in Table 2.

EXAMPLES 2 A-C (COMPARATIVE)

The process of Examples 1 A-C was repeated with the following modifications: Monomer feeds 1 and 2, as described in Table 1, were admixed to obtain a polymer with a homogeneous monomer composition. As initial charge, 3.2% of the combined monomer feed was added. After completion of the seed polymerization, the remaining amount of the combined monomer feed was added to the reactor with a constant dosage rate over 210 min.

The properties of the resulting polymer dispersions are summarized in Table 2.

EXAMPLES 3 A (INVENTIVE), B (INVENTIVE), C (COMPARATIVE)

The process of Examples 1 A-C was repeated with varying monomer feed compositions, as described in Table 1.

The properties of the resulting polymer dispersions are summarized in Table 2.

EXAMPLES 4 A-C (COMPARATIVE)

The process of Examples 3 A-C was repeated with the following modifications: Monomer feeds 1 and 2, as described in Table 1, were admixed. As initial charge, 3.2% of the combined monomer feed was added. After completion of the seed polymerization, the remaining amount of the combined monomer feed was added to the reactor with a constant dosage rate over 210 min.

The properties of the resulting polymer dispersions are summarized in Table 2.

TABLE 1

Composition of the monomer feeds of Ex. 1-4 (in grams)

|  | Ex. 1 | Ex. 2 | Ex. 3 | Ex. 4 |
|---|---|---|---|---|
| Monomer feed 1 | | | | |
| DI water | | 291.6 | | 291.6 |
| Sodium lauryl ether sulfate, 27% in water | | 23.1 | | 23.1 |
| Sodium persulfate | | 2.1 | | 2.1 |
| Methacrylic acid | | 7.8 | | 5.2 |
| Methacrylamide | | 15.6 | | 20.7 |
| AMPS ® 2403 Monomer [1] | | 31.1 | | 41.5 |
| Styrene | | 194.4 | | 226.8 |
| 2-Ethylhexyl acrylate | | 226.8 | | 421.2 |
| n-Butyl acrylate | | 226.8 | | 0 |
| Monomer feed 2 | | | | |
| DI water | | 248.4 | | 248.4 |
| Sodium lauryl ether sulfate, 27% in water | | 19.7 | | 19.7 |
| Sodium persulfate | | 1.8 | | 1.8 |
| Methacrylic acid | | 1.6 | | 1.1 |
| Methacrylamide | | 3.3 | | 4.4 |
| AMPS ® 2403 Monomer [1] | | 6.6 | | 8.8 |
| Styrene | | 220.8 | | 441.6 |
| Methyl methacrylate | | 220.8 | | 0 |
| 2-Ethylhexyl acrylate | | 110.4 | | 110.4 |

[1] AMPS ® 2403 Monomer (Lubrizol) is a 50% aqueous solution of sodium 2-acrylamido-2-methyl-1-propanesulfonate.

EXAMPLES 5-8 (INVENTIVE AND COMPARATIVE BIOCIDE-FREE SEMI-GLOSS INTERIOR PAINTS)

Biocide-free semi-gloss interior paints were prepared by mixing the ingredients in Table 3 at room temperature under stirring. After dissolving and dispersing item nos. 2-5 in water, pigment and fillers as per item nos. 6-8 were dispersed consecutively by increasing the dissolver speed to 5000 rpm. After the preparation of the mill base, item nos. 9-13 were added while gently stirring. The solid contents of all polymer dispersions were adjusted to 45% before their addition. The resulting paints had a solid content of approx. 54% and a pigment volume concentration (PVC) of approx. 39% (counting potassium silicate as binder).

The properties of the resulting paints are displayed in Table 4.

TABLE 3

Composition of biocide-free semi-gloss interior paints

| Pos. | | Supplier | Description | Parts per weight |
|---|---|---|---|---|
| 1 | Water | | | 104.5 |
| 2 | Tylose ® H 15000 YP2 | SE Tylose | Thickener | 1.5 |
| 3 | Lopon ® 827 | ICL | Stabilizer | 1.0 |
| 4 | Lopon ® 890 | ICL | Dispersing agent | 1.5 |
| 5 | Agitan ® 381 | Münzing | Defoamer | 1.5 |
| 6 | Kronos ® 2190 | Kronos | Titanium dioxide | 95.0 |
| 7 | Hydrocarb ® 90-OG | Omya | Calcium carbonate | 60.0 |
| 8 | Omyacarb ® 2 GU | Omya | Calcium carbonate | 15.0 |
| 9 | Caustic soda, 10% | | Base | 1.0 |
| 10 | Coapu ™ 830 W | Arkema | PU Thickener | 1.0 |

TABLE 2

Properties of the biocide-free polymer dispersions

| | Examples[1] | | | | | | | | | | | |
|---|---|---|---|---|---|---|---|---|---|---|---|---|
| | 1a | 1b | C1c | C2a | C2b | C2c | 3a | 3b | C3c | C4a | C4b | C4c |
| Betolin ® K 28 (%) | 2.5 | 5.0 | 0 | 2.5 | 5.0 | 0 | 2.5 | 5.0 | 0 | 2.5 | 5.0 | 0 |
| Solid content (%)[2] | 46.6 | 45.9 | 46.4 | 47.0 | 46.4 | 47.5 | 47.1 | 46.4 | 48.1 | 47.4 | 46.9 | 48.0 |
| Brookfield viscosity (mPa s)[3] | 570 | 335 | 1625 | 1855 | 1295 | 4400 | 775 | 445 | 1470 | 1090 | 715 | 1850 |
| pH | 11.1 | 11.2 | 11.1 | 11.2 | 11.1 | 11.1 | 11.1 | 11.3 | 11.1 | 11.2 | 11.3 | 11.3 |
| $d_w$ (nm)[4] | | 100 | | | 110 | | | 100 | | | 120 | |
| $T_g$ (° C.)[5] | | −12.6; 55.3 | | | 15.6 | | | −9.0; 53.0 | | | 18.7 | |
| MFFT (° C.)[6] | | 0 | | | 6 | | | 0 | | | 9 | |
| TVOC (ppm)[7] | | 786 | | | 684 | | | 965 | | | 933 | |
| Brookfield visc.[8] (mPa s, 28 d, 50° C.) | 2550 | 1300 | 2490 | 6160 | 4450 | 4520 | 2220 | 880 | 2060 | 2430 | 1840 | 2270 |
| pH (7 d, 50° C.)[9] | 10.7 | 10.9 | 9.9 | 10.9 | 10.8 | 9.4 | 10.8 | 10.9 | 9.9 | 19.8 | 10.9 | 9.8 |
| pH (28 d, 50° C.)[9] | 10.7 | 11.0 | 9.5 | 10.7 | 10.9 | 9.2 | 10.8 | 11.0 | 9.5 | 10.8 | 11.0 | 9.6 |

[1] Comparative examples are marked with a 'C'
[2] Gravimetric determination after 24 h drying at 110° C.
[3] Measurement conditions: 20° C., 20 rpm, spindle 3
[4] Weight-average particle diameter as determined by a Beckman Coulter LS 13320 Particle Size Analyzer
[5] Glass transition temperature as measured by differential scanning calorimetry (DSC) according to ISO 16805. In case of heterogeneous polymer compositions, the glass transition temperatures of soft and hard polymer phase are reported.
[6] The minimum film forming temperature (MFFT) is defined as the lowest temperature at which a polymer dispersion coalesces when laid on a substrate as a thin film, thereby forming clear transparent film.
[7] Total Volatile Organic Compound (TVOC) content as determined by gas chromatography according to ISO 11890-2
[8] Brookfield viscosity of the polymer dispersions as measured after storage at 50° C. for 28 days. Measurement conditions: 20° C., 20 rpm, spindle 3 or spindle 4 (C2a)
[9] pH of the polymer dispersions as measured after storage at 50° C. for 7 days and 28 days, respectively TABLE 3-continued Composition of biocide-free semi-gloss interior paints

| Pos. | Supplier | Description | Parts per weight |
|---|---|---|---|
| 11 | Agitan ® 381 | Münzing Defoamer | 1.5 |
| 12 | Dispersion per Ex. 1-4 | | 201.5 |
| 13 | Betolin ® K 28 | Wöllner Potassium silicate | 15.0[1] |

[1] If the dispersion in item 12 already contained Betolin ® K 28 (variations A and B), the amount of item 13 was reduced to keep the total amount of Betolin ® K 28 constant at 3 wt. % for all paints.

TABLE 4

Properties of the biocide-free semi-gloss interior paints

| Paint[1] | 5a | 5b | C5c | C6a | C6b | C6c | 7a | 7b | C7c | C8a | C8b | C8c |
|---|---|---|---|---|---|---|---|---|---|---|---|---|
| Dispersion as per Ex.[1] | 1a | 1b | C1c | C2a | C2b | C2c | 3a | 3b | C3c | C4a | C4b | C4c |
| pH (fresh)[2] | 10.9 | 10.9 | 10.9 | 10.9 | 10.9 | 10.8 | 10.9 | 11.0 | 10.9 | 10.9 | 11.0 | 10.9 |
| pH (28 d, 50° C.)[2] | 10.7 | 10.8 | 10.9 | 10.6 | 10.7 | 10.5 | 10.8 | 11.0 | 10.6 | 10.8 | 10.9 | 10.7 |
| WSR (μm)[3] | 9.6 | 9.8 | 9.9 | 7.1 | 7.5 | 6.0 | 8.6 | 8.9 | 8.1 | 6.7 | 7.0 | 6.7 |
| WSR (class)[3] | II | II | II | II | II | II | II | II | II | II | II | II |
| Gloss (60°)[4] | 5.0 | 5.1 | 4.8 | 5.9 | 5.4 | 6.4 | 4.3 | 4.4 | 4.1 | 5.6 | 5.6 | 5.1 |
| Gloss (85°)[4] | 25.6 | 25.8 | 24.8 | 28.8 | 25.7 | 30.0 | 23.3 | 22.7 | 23.9 | 27.5 | 26.7 | 26.7 |
| Blocking (40° C., g/6.25 cm²)[5] | 258 | 156 | 298 | 598 | 632 | 710 | 424 | 478 | 394 | 954 | 834 | 930 |

[1] Comparative examples are marked with a 'C'
[2] pH of the paints as measured when freshly prepared and after storage at 50° C. for 28 days
[3] The wet scrub resistance (WSR) of the above paints was tested by means of the nonwoven pad method according to ISO 11998. The paints were applied onto Leneta foil P121-10N with a 300 μm scraper. After drying for 28 days at 23° C. and 50% relative humidity, the paint films were inserted into abrasion tester model 494 (Erichsen) with adapters for wet scrub tests according to ISO 11998 and scrubbed with Scotch-Brite ™ Handpad 7448, Type S Ultra Fine (3M) after treatment of pad and film with a 0.25% aqueous solution of sodium n-dodecylbenzenesulfonate. Reported are the thickness loss of the paint film in μm after 200 cycles and the corresponding classification of the paint according to EN 13300.
[4] Paint films were cast onto a glass plate with a scraper to yield a wet film thickness of approx. 300 μm and dried at room temperature for 7 days. The gloss was then measured with a glossmeter according to ASTM D523.
[5] Leneta contrast cards (75 × 25 mm) glued to wooden panels were coated at a wet film thickness of 200 μm. After drying for 24 h, two coated cards were placed on top of each other at a 90° angle with their coated sides facing each other. They were then subjected to a force of 2 kg at 40° C. for 1 h. Reported is the force required to separate the cards (average of 5 measurements).

While all dispersions are initially protected against microbiological attack through their high pH, those dispersions not comprising Betolin® K 28 experience a pronounced pH drop upon storage. Even after 7 days at 50° C., the pH of all dispersions without potassium silicate is below 10.0, resulting in an unacceptably low shelf life. Those dispersions comprising Betolin® K 28 maintain a high pH>10.5 even after 28 days of storage at 50° C. and are hence sufficiently protected against microbial growth, even when stored for an extended period of time.

Only solvent-, coalescent-, and plasticizer-free paints based on dispersions 1a-b and 3a-c form a crack-free film below 5° C. When formulated as glossy coatings, only these dispersions exhibit sufficiently high block resistance.

In summary, only the inventive dispersions 1a, 1b, 3a, and 3b exhibit sufficient pH stability upon storage while allowing the coalescent-free formulation of biocide-free glossy coatings with low block resistance and low temperature film formation (Table 5).

TABLE 5

Experimental summary

| Dispersion | MFFT < 5° C. | Sufficient pH stability of dispersion?[1] | Good block resistance of semi-gloss paint?[2] |
|---|---|---|---|
| 1a | Yes | Yes | Yes |
| 1b | Yes | Yes | Yes |
| C1c | Yes | No | Yes |
| C2a | No | Yes | No |
| C2b | No | Yes | No |
| C2c | No | No | No |
| 3a | Yes | Yes | Yes |
| 3b | Yes | Yes | Yes |
| C3c | Yes | No | Yes |
| C4a | No | Yes | No |
| C4b | No | Yes | No |
| C4c | No | No | No |

[1] pH > 10.5 after storage at 50° C. for 28 days
[2] Values below 500 g/6.25 cm² indicate good block resistance While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A biocide- and ammonia-free aqueous polymer dispersion obtained by radically initiated multi-stage emulsion polymerization and comprising particles comprising at least a first polymer phase formed from a monomer composition I and a second polymer phase from a different monomer composition II,
wherein the first polymer phase has a glass transition temperature below 20° C., and wherein the second polymer phase has a glass transition temperature above 20° C., both as determined by differential scanning calorimetry according to ISO 16805, wherein the polymer dispersion further comprises at least one water-soluble alkali metal silicate, at least one water-soluble alkali metal alkyl siliconate, at least one water-soluble alkaline earth metal alkyl siliconate, or a mixture thereof, and wherein the pH of the polymer dispersion is 10.0 or higher.

2. An aqueous polymer dispersion according to claim 1, wherein the first polymer phase has a glass transition temperature in the range of from −30 to 10° C., and wherein the second polymer phase has a glass transition temperature above 30° C., both as determined by differential scanning calorimetry according to ISO 16805.

3. An aqueous polymer dispersion according to claim 1, wherein at least one of monomer compositions I or II comprises monomers selected from the group consisting of esters of acrylic or methacrylic acid, styrene and mixtures thereof.

4. An aqueous polymer dispersion according to claim 1, wherein monomer compositions I and II comprise at least 50% of monomers selected from the group consisting of esters of acrylic or methacrylic acid, styrene and mixtures thereof.

5. An aqueous polymer dispersion according to claim 1, wherein at least one of monomer compositions I or II comprises monomers selected from the group of ethylenically unsaturated sulfonic acids, ethylenically unsaturated phosphonic and phosphoric acids, ethylenically unsaturated carboxylic acids, ethylenically unsaturated carboxylic amides, ethylenically unsaturated carboxylic anhydrides and mixtures thereof.

6. An aqueous polymer dispersion according to claim 1, wherein at least one of monomer compositions I or II comprise monomers selected from the group of ethylenically unsaturated sulfonic acids, ethylenically unsaturated carboxylic amides, and mixtures thereof.

7. An aqueous polymer dispersion according to claim 1, wherein at least one of monomer compositions I or II comprise a mixture of at least one ethylenically unsaturated sulfonic acid and at least one ethylenically unsaturated carboxylic amide.

8. An aqueous polymer dispersion according to claim 1, wherein the pH of the polymer dispersion is in the range of 10.0 to 12.0.

9. An aqueous polymer dispersion according to claim 1 having a minimum film forming temperature (MFFT) less than 6° C.

10. An aqueous polymer dispersion according to claim 1 having a Total Volatile Organic Compound (TVOC) content less than 2000 ppm, as determined by gas chromatography according to ISO 11890-2.

11. An aqueous polymer dispersion according to claim 1, wherein the polymer particles have a weight-averaged diameter of less than 150 nm, as measured by a combination of laser diffraction and polarization intensity differential scattering (PIDS) using a Beckman Coulter LS 13320 Particle Size Analyzer.

12. An aqueous polymer dispersion according to claim 1, wherein the polymer dispersion comprises, based on the total weight of the polymer dispersion, 0.1 to 4 wt. % of at least one water-soluble alkali metal silicate, at least one water-soluble alkali metal alkyl siliconate, at least one water-soluble alkaline earth metal alkyl siliconate, or a mixture thereof.

13. An aqueous polymer dispersion according to claim 1, wherein the polymer dispersion comprises 0.1 to 4 wt. % potassium silicate, potassium methyl siliconate, or a mixture thereof.

14. An aqueous polymer dispersion according to claim 1, wherein the polymer dispersion comprises 0.1 to 4 wt. % potassium silicate.

15. An aqueous polymer dispersion according to claim 1 and exhibiting a pH drop less than 1.0, when stored for 28 days at 50° C.

16. A process for preparing an aqueous polymer dispersion according to claim 1 by multi-stage emulsion polymerization, wherein each of the monomer compositions I and II is emulsified and polymerized in aqueous phase in the presence of emulsifiers, initiators and optionally protective colloids at a polymerization temperature ranging from 50 to 95° C.

17. A process according to claim 16, wherein the monomer composition I is polymerized in a first stage to obtain the first polymer phase, and subsequently the monomer composition II is polymerized in a second stage to obtain the second polymer phase.

18. A process according to claim 16, wherein at least one water-soluble alkali metal silicate, at least one water-soluble alkali metal or alkaline earth metal alkyl siliconate, or a mixture thereof is post-added to the dispersion below 50° C.

19. A process according to claim 16, wherein part of either monomer composition I or II is prepolymerized before the remaining parts of monomer compositions I and II are supplied to the multi-stage emulsion polymerization.

20. A coating composition comprising the aqueous polymer dispersion according to claim 1.

21. A coating composition according to claim 20 having more than 10 gloss units, when measured with a glossmeter at an angle of 85° according to ASTM D523.

22. A coating composition according to claim 20, which fulfills the requirements of the EU Ecolabel as defined in the Commission Decision 2014/312/EU regarding Total Volatile Organic Compound (TVOC) and Total Semi Volatile Organic Compound (TsVOC) content.

23. A coating composition according to claim 20 having a TVOC content less than 1000 ppm, as determined by gas chromatography according to ISO 11890-2.

24. A coating composition according to claim 20, which is free of any organic solvent, plasticizer or coalescent agent.

25. A coating composition according to claim 20, having at least a wet scrub class II according to EN 13300.

* * * * *